(12) United States Patent
Euzen et al.

(10) Patent No.: US 6,284,210 B1
(45) Date of Patent: *Sep. 4, 2001

(54) COMBUSTION CATALYST AND COMBUSTION PROCESS USING SUCH A CATALYST

(75) Inventors: Patrick Euzen, Rueil Malmaison; Eric Tocque; Stephane Rebours, both of Chatou; Gil Mabilon, Carrieres sur Seine, all of (FR)

(73) Assignee: Institut Francais du Petrole, Rueil Malmaison (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/857,072

(22) Filed: May 15, 1997

Related U.S. Application Data

(63) Continuation-in-part of application No. 08/558,188, filed on Nov. 15, 1995.

(30) Foreign Application Priority Data

Nov. 15, 1994 (FR) .................................. 94 13739

(51) Int. Cl.$^7$ ...................................................... B01J 8/02
(52) U.S. Cl. .................................. 423/213.5; 423/213.2; 431/7
(58) Field of Search ..................................... 502/326, 303, 502/304; 423/213.5, 241, 261, 213.2; 431/7

(56) References Cited

U.S. PATENT DOCUMENTS

| | | | |
|---|---|---|---|
| 3,870,455 | 3/1975 | Hindin | 431/7 |
| 4,378,307 | 3/1983 | Brunelle et al. | 252/455 R |
| 4,448,895 * | 5/1984 | Ono et al. | 423/213.5 |
| 4,857,499 * | 8/1989 | Ito et al. | 502/304 |
| 4,904,633 * | 2/1990 | Ohata et al. | 502/304 |
| 5,013,705 * | 5/1991 | Koberstein et al. | 502/262 |
| 5,260,249 * | 11/1993 | Shiraishi et al. | 502/304 |
| 5,425,632 | 6/1995 | Kazunori et al. | 431/7 |
| 5,643,543 | 7/1997 | Guibard et al. | 423/213.5 |

FOREIGN PATENT DOCUMENTS

| | | |
|---|---|---|
| 0 125 565 | 11/1984 | (EP) . |
| 0 170 588 | 2/1986 | (EP) . |
| 0 326 845 | 8/1989 | (EP) . |
| 624399 * | 11/1994 | (EP) . |
| 5-200294 | 8/1993 | (JP) . |

OTHER PUBLICATIONS

D. Reay, *Heat Recovery Systems & CHP*, vol. 13, No. 5, pp. 383–390 (1993).

D. L. Trimm, "Stucies in Surface Science: Thermal Stability of Catalyst Supports", vol. 68, pp. 29–51 (1991).

B. Béguin et al., *Applied Catalysis*, vol. 75, pp. 119–132 (1991).

English Abstract of JP 5–200294.

* cited by examiner

*Primary Examiner*—Steven P. Griffin
*Assistant Examiner*—Christina Ildebrando
(74) *Attorney, Agent, or Firm*—Millen White Zelano & Branigan

(57) ABSTRACT

A combustion catalyst comprising a monolithic substrate, a porous support based on refractory inorganic oxide and an active phase formed by cerium, iron and at least one metal selected from the group formed by palladium and platinum, the content of porous support being between 100 and 400 g per liter of catalyst; the content of cerium being between 0.3 and 20% by weight with respect to the porous support; the content of iron being between 0.01 and 3.5% of iron by weight with respect to the porous support; and the content of palladium and/or platinum being between 3 and 20 g per liter of catalyst.

Figure 1:
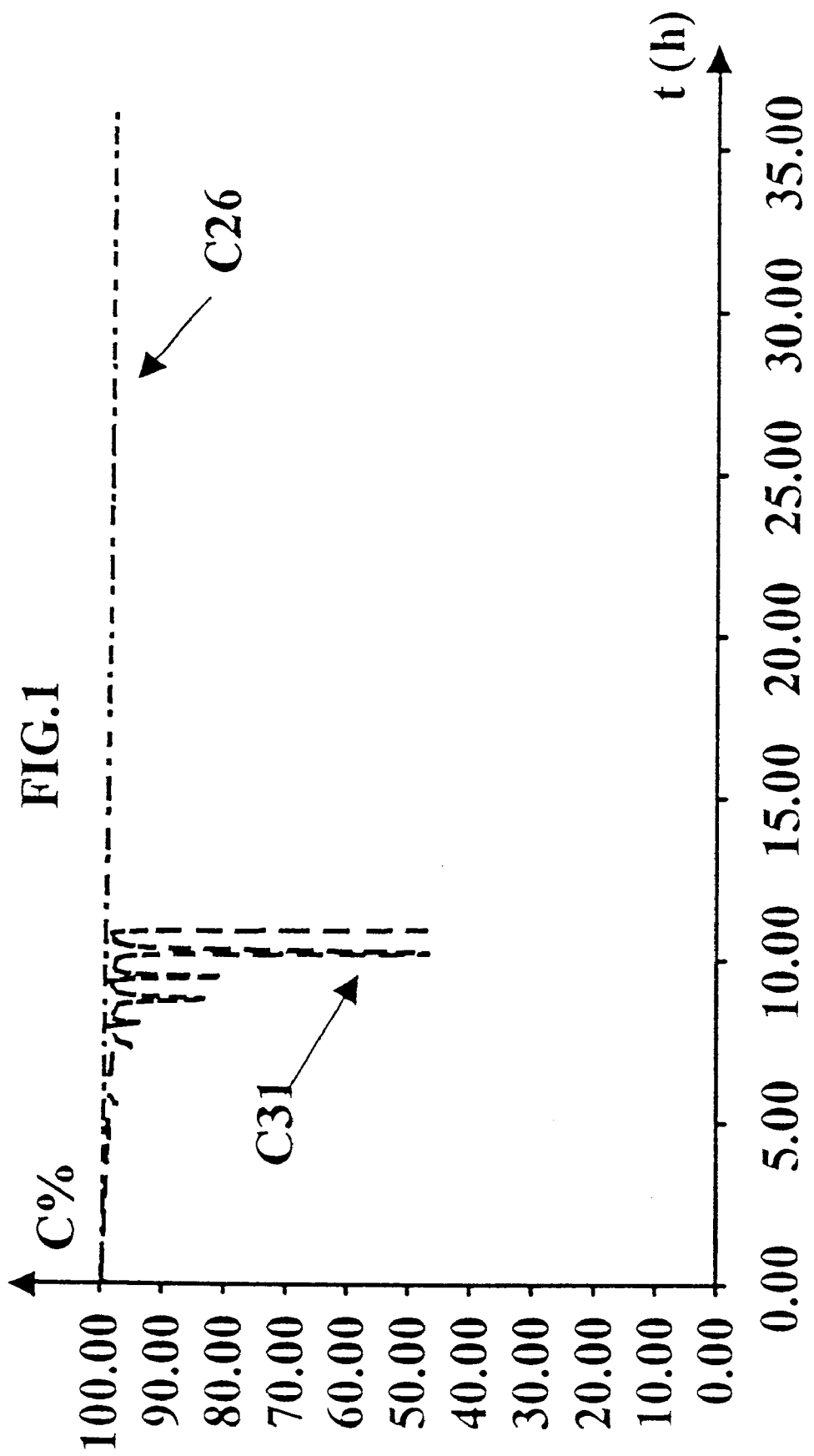

The catalyst of the invention is used in particular in processes for the catalytic combustion of hydrocarbons, carbon monoxide, hydrogen or mixtures thereof, in processes involving one or more catalytic stages.

20 Claims, 4 Drawing Sheets

US 6,284,210 B1

COMBUSTION CATALYST AND COMBUSTION PROCESS USING SUCH A CATALYST

CROSS REFERENCE TO RELATED APPLICATION

This application is a continuation-in-part of pending U.S. application Ser. No. 08/558,188 filed Nov. 15, 1995, incorporated by reference herein.

SPECIFICATION

The present invention concerns a non-selective oxidation catalyst and the use thereof in the catalytic combustion of hydrocarbons, carbon monoxide, hydrogen or mixtures thereof.

Conventional combustion conducted in the presence of a flame, which is usually employed in processes for the combustion of hydrocarbons such as methane is a procedure which is difficult to control. It occurs in a well-defined range of air/hydrocarbon concentrations and, besides the formation of carbon dioxide and water, it results in the production of pollutants such as carbon monoxide and nitrogen oxides. Catalytic combustion produces few pollutants such as $NO_x$ and CO. In addition the introduction of a catalyst permits better control of total oxidation in a wide range of values in respect of the air/hydrocarbon ratio. They can be outside the limits of inflammability of conventional combustion. It may also be mentioned that it results in more compact apparatuses and that it makes it possible to burn a very wide variety of compounds.

As described in particular by D Reay in 'Catalytic Combustion: Current Status and Implications for Energy Efficiency in the Process Industries. Heat Recovery Systems & CHP, 13, No 5, pages 383–390, 1993' and D Jones and S Salfati in 'Rev Gen Therm Fr No 330-331, pages 4101–406, June–July 1989', there are multiple applications of catalytic combustion: radiant panels and tubes, catalytic heaters, gas turbines, co-generation, burners, catalytic sleeves for vapor-reforming tubes, production of hot gases in the field of heating by direct contact and reactors with catalytic plates. Because the standards relating to the NOx emitted by combustion processes are becoming more severe at an ever quickening rate, the catalytic combustion chamber can advantageously replace conventional burners which are the origin of high proportions of NOx. The operating conditions—highly oxidizing medium—of a catalytic combustion chamber are very remote from the applications of automobile post-combustion: treatment of the exhaust gases from petrol vehicles operating at the Level of richness 1 with a high content of $NO_x$ and treatment of the exhaust gases from diesel vehicles with a high proportion of particles and NOx. Those fundamental differences involve seeking dedicated formulations for combustion catalysts.

Combustion catalysts are generally prepared from a monolithic substrate of ceramic or metal, on which there is deposited a fine support layer formed by one or more refractory oxides of a surface area and porosity greater than those of the monolithic substrate. The active phase which is composed essentially of metals of the platinum group is dispersed on that oxide.

Thermal stability, low-temperature catalytic activity and stability of catalytic activity generally constitute the three main criteria for selection of the catalyst.

There are combustion catalysts which are more resistant to high temperature. In some combustion processes the catalysts may be subjected to very high temperatures which are often higher than 1000° C. In the course of their use at such high temperatures however it is found that the catalysts suffer from degradation which reduces their levels of catalytic performance. Sintering of the support and sintering of the active phase and/or encapsulation thereof by the support are part of the most generally quoted causes for explaining such degradation. In the case of such catalysts which operate at high temperature thermal resistance may become the predominant criterion, to the detriment of catalytic activity. The supports of those catalysts are generally alumina-based. It is known to the man skilled in the art that the drop in specific surface area can be effectively stabilized by a suitable doping agent. Rare earths and silica are often mentioned as being among the stabilizing agents with the best levels of performance in respect of the alumina. Catalysts prepared by that procedure are described inter alia in U.S. Pat. No. 4,220,559. In that document the catalyst comprises metals from the group of platinum or transition metals which are deposited on alumina, an oxide of a metal selected from the group formed by barium, lanthanum and strontium and an oxide of a metal selected from the group formed by tin, silicon, zirconium and molybdenum.

In addition, in order to limit sintering of the active metallic phase, it has been proposed that various stabilizing agents based essentially on oxides of transition metals may be added.

Thus, in US patent U.S. Pat. No. 4,857,499 the catalyst comprises a porous support in which the diameter of the pores is between 150 and 300 Å and of which the proportion by weight with respect to the substrate is preferably between 50 and 200 g/l, an active phase including at least 10% by weight, with respect to the porous support, of a precious metal selected from the group formed by palladium and platinum; a first promoter including at least one element selected from the group formed by lanthanum, cerium, praseodymium, neodymium, barium, strontium, calcium and oxides thereof, of which the proportion by weight, with respect to the porous support, is between 5 and 20%; a second promoter including at least one element selected from the group formed by magnesium, silicon and oxides thereof, of which the proportion by weight, with respect to the active phase, is less than or equal to 10%, and a third promoter including at least one element selected from the group formed by nickel, zirconium, cobalt, iron and manganese and oxides thereof, of which the proportion by weight, with respect to the active phase, is less than or equal to 10%. In addition said catalyst can be deposited on a monolithic substrate belonging to the group formed by cordierite, mullite, alpha alumina, zirconia and titanium oxide; the proportion by weight of porous support with respect to the volume of substrate being between 50 and 200 g/l.

In US patent U.S. Pat. No. 4,793,797 the catalyst comprises an inorganic support selected from the group formed by oxides, carbides and nitrides of elements belonging to groups IIa, IIIa and IV of the periodic system of elements or selected from the group formed by La-β-$Al_2O_3$, Nd-β-$Al_2O_3$, Ce-β-$Al_2O_3$ or Pr-β-$Al_2O_3$, at least one precious metal selected from the group formed by palladium, platinum, rhodium and ruthenium, and at least one oxide of a base metal selected from the group formed by magnesium, manganese, cobalt, nickel, strontium, niobium, zinc, tin, chromium and zirconium, such that the atomic ratio of the base metal to the precious metal is between 0.1 and 10.

In regard to some thereof those catalysts exhibit increased durability with respect to the active metallic phase alone.

However the doping agents used are adapted to very severe temperature conditions which may exceed 1000° C. They do not make it possible effectively to limit the deterioration in the levels of performance of the catalyst which occurs at moderate temperatures and which may be due to various causes that are different from those which are the origin of the deterioration at high temperatures.

Moreover, combustion catalysts have also been proposed, based on hexaaluminates containing manganese, affording a good compromise in terms of catalytic activity/thermal stability, as described particular in US patent U.S. Pat. No. 4,788,174. The oxidation catalyst which is thus proposed may be represented by the following formula:

$$A_{1-z}C_zB_xAl_{12-y}O_{19-\alpha'}$$

wherein:

A is at least one element selected from the group formed by Ba, Ca and Sr with (0.0≦0≦0.4);

B is at least one element selected from the group formed by Mn, Fe, Co, Ni, Cu and Cr with (x≦y≦2x);

C is K and/or Rb; and

α=1½{X——z(X——Y)+xZ——3Y) in which X, Y and Z respectively represent the valencies of the elements A, C and B.

Such catalysts however are found to exhibit activity at low temperature which is inadequate to meet the requirements of a combustion process. In order to remedy that disadvantage it has been proposed that a precious metal can be added to such catalysts, as described in particular in US patent U.S. Pat. No. 4,959,339. The catalyst proposed in that way is represented by the formula:

$$A_{1-z}C_zB_xD_uAl_{12-y-u}O_{19-\alpha}$$

wherein

A is at least one element selected from the group formed by Ba, Ca and Sr with (0.0≦z≦0.4);

B is at least one element selected from the group formed by Mn, Fe, Co, Ni, Cu and Cr with (x≦y≦2x);

C is at least one element selected from the group formed by K, Rb and the rare earths, D is at least one element selected from the group formed by Au, Ag, Pd, Pt and another precious metal of the group of platinum with x+u≦4; and α=1½{X——z(X——Y)+xz+uU——3y-3u} wherein X, Y, Z and U respectively represent the valencies of the elements A, C, B and D.

In regard to some thereof those catalysts have a level of low-temperature activity which is increased in relation to a catalyst without a metallic phase.

It has also been proposed that a plurality of different catalysts can be juxtaposed in a reactor having catalytic stages; the first catalysts being more specifically dedicated to starting the combustion reaction, the following catalysts serving to stabilize the high temperature combustion reaction, and the number of catalytic stages (or zones J being adjusted in dependence on the conditions imposed by the use envisaged. Thus the following systems are known:

First catalytic zone: Pd and Pt and NiO; and second catalytic zone: Pt and Pd; for example as described in European patent application EP-A-198 948;

First catalytic zone: Pd and/or Pt; second catalytic zone: $Sr_{0.8}La_{0.2}MnAl_{11}O_{19\alpha}$ and third catalytic zone: $Sr_{0.8}La_{0.2}M_nAl_{11}O_{19-\alpha}$; for example as described in Japanese patent application JP-A-04/197 443; and First catalytic zone; Pd and (Pt or Ag); second catalytic zone: Pd and (Pt or Ag); and third catalytic zone: perovskite $ABO_3$ or oxide of metal of group V (Nb or V), group VI (Cr) or group VIII (Fe, Co, Ni); for example as described in international patent applications WO-A-92/9848 and WO-A-92/9849.

Furthermore, it is known that as regards motor vehicles that are powered by natural gas, natural gas is a promising fuel that responds to the growing concerns regarding environmental protection. It is a fuel that is used today by more than one million vehicles in the world (270,000 in Italy, 250,000 in Russia, 150,000 in Argentina, 50,000 in New Zealand, 40,000 in the United States, and 40,000 in Canada). Private and commercial vehicles run on gasoline or natural gas bicarburation. Vehicles with diesel engines (in particular buses) have been adapted to run on natural gas. Limited development of these types of vehicles is planned in several European countries (the Netherlands, Denmark, Switzerland, Belgium) and more energetically in Canada, the United States, and Australia. Methane represents on the order of 5 to 10% (about 100–200 ppmC) of emissions from gasoline-powered vehicle hydrocarbons. This proportion increases to 10–20% after passage over a catalyst because the methane is less well eliminated than the other hydrocarbons. It represents more than 95% of the hydrocarbons (about 1500 ppmC, or 5 to 10 times more than the emissions of gasoline engines) that are contained in the exhaust gases of vehicles with regulated richness that run on natural gas. Thus, for the standardized 13-mode European cycle of a bus engine that runs on natural gas in a lean mixture, several measurements of the composition of the exhaust gases by gas chromatography on line show that the latter does not vary significantly either as a function of richness or as a function of load and conditions (see Tables A and B below).

TABLE A

Influence of richness on the composition for the full-load point of 1260 rpm 1000 m.N

| | meth-ane | eth-ane | ethyl-ene | pro-pane | pro-pyl-ene | iso-bu-tane | acet-ylene | bu-tane |
|---|---|---|---|---|---|---|---|---|
| Lacq. Gas | 97.4 | 1.87 | — | 0.11 | — | — | — | 0.21 |
| R = 0.66 | 97.23 | 1.88 | 0.69 | 0.09 | 0.02 | 0.02 | 0.04 | 0.03 |
| R = 0.60 | 97.43 | 2.02 | 0.33 | 0.1 | 0.01 | 0.03 | 0.08 | 0.00 |
| R = 0.58 | 96.28 | 2.51 | 0.99 | 0.09 | 0.02 | 0.04 | 0.06 | 0.00 |

TABLE B

Comparison of the composition at iso-richness 0.60 for two points with low load, 1260 rpm 100 m.N and 2100 rpm 90 m.N

| | meth-ane | eth-ane | ethyl-ene | pro-pane | pro-pyl-ene | iso-bu-tane | acet-ylene | bu-tane |
|---|---|---|---|---|---|---|---|---|
| 1260 rpm | 96.51 | 2.29 | 0.93 | 0.09 | 0.02 | 0.02 | 0.08 | 0.04 |
| 2100 rpm | 95.46 | 3.08 | 1.19 | 0.09 | 0.03 | 0.06 | 0.07 | 0.0 |

In spite of the numerous improving works which have already been produced, there is still an attraction in seeking catalysts which enjoy an increased level of activity and stability, in particular at low temperature. Indeed the solutions proposed such as formulations based on hexaaluminates which are doped by a precious metal or the use of different formulations in a reactor having a plurality of catalytic stages do not solve the problem of stability of the active phase at low temperature which is also the cause of a deterioration in the levels of performance. Among the causes envisaged for that deterioration in the levels of low-temperature performance, sintering and/or poisoning of the metallic phase as well as a modification in the oxidation state of the active phase are part of those which are most generally referred to.

Moreover, in accordance with European patent EP-B-27069, catalysts are known for the treatment of internal combustion engine exhaust gases, comprising iron and cerium which are associated with metals from the group of platinum, which are deposited on a refractory inorganic oxide.

The research work carried on by the applicants led them to discover that surprisingly catalysts containing both iron, cerium and precious metals, while remedying the disadvantages exhibited by the prior-art catalysts, are found to exhibit an excellent degree of activity as well as remarkable stability in the course of time.

The present invention therefore proposes a combustion catalyst characterized in that it comprises a monolithic substrate, a porous support based on refractory inorganic oxide and an active phase formed by cerium, iron and at least one metal selected from the group formed by palladium and platinum; the content of porous support being between 100 and 400 g per liter of catalyst; the content of cerium being between 0.3 and 20% by weight with respect to the porous support; the content of iron being between 0.01 and 3.5% of iron by weight with respect to the support; and the content of palladium and/or platinum being between 3 and 20 g per liter of catalyst.

In accordance with preferred features of the catalyst of the present invention the proportion of porous support is between 200 and 350 g per liter of catalyst; the proportion of cerium is between 2 and 15% by weight with respect to the porous support; the proportion of iron is between 0.1 and 2% of iron by weight with respect to the support; and the proportion of palladium and/or platinum is between 5 and 15 g per liter of catalyst.

The proportion of porous support in the catalyst according to the invention preferably varies between 100 and 400 g per liter of catalyst and still more preferably between 200 and 350 g/l. If the content of porous support is less than 100 g the level of catalytic activity is not adequate. Conversely a content of porous support of higher than 400 g/l is also harmful in terms of catalytic activity as it results in the passages in the monolith becoming blocked.

In the catalysts of the invention the monolithic substrate may consist of a monolith with a cellular structure of ceramic or metal (winding or stacking of metallic strips or association of metallic fiber or metallic wires in the form of a monolith with a fibrous structure). The ceramic used may be mullite, cordierite, alpha alumina, zirconia, aluminum titanate, silicon carbide, silicon nitride or mixtures thereof. Those monolithic substrates are produced by extrusion. The metallic alloys used most preferably have refractory properties. They may be composed for example of iron, chromium, aluminum and cerium or yttrium such as the steel Gilphal 135® from the company Imphy. The metallic substrate may be previously subjected to an oxidizing treatment at a temperature of between 700° C. and 1200° C., preferably between 800 and 1000° C. The density of cells, that is to say the number of cells per section of monolith, is generally between 50 and 600 cells per square inch (7.75 to 93 cells per cm$^2$).

The catalysts according to the invention provide improved levels of performance in particular in processes for the catalytic combustion of hydrocarbons, carbon monoxide, hydrogen or mixtures thereof. They can also be used however in all catalytic oxidation processes which operate at elevated temperatures.

Preparation and shaping of the support may constitute the first step in preparation of the catalysts. The support based on refractory oxide which is used according to the invention is generally selected from the group formed by refractory oxides of the metals from groups Ia, Ea, IVa and IVb of the periodic system of elements and mixtures thereof in any proportions.

In most cases aluminum oxide of the general formula $Al_2O_3$, $nH_2O$ is used. Its specific surface area is between 10 and 500 m/g. That oxide in which n is between 0 and 0.6 is conventionally obtained by controlled hydration of hydroxides in which $1 \leq n \leq 3$. Those hydroxides are themselves prepared by precipitation in an aqueous medium of aluminum salts by bases or acids. The precipitation and ageing conditions define a number of forms of hydroxides of which the most common are boehmite (n=1), gibbsite and bayerite (n=3). In dependence on the hydrothermal treatment conditions those hydroxides give a plurality of transition aluminas or oxides. The forms are thus denoted alpha, delta, eta, gamma, kappa, khi, rho and theta. They are essentially differentiated by the organization of their crystalline structures. When heat treatments are carried out those different forms are capable of developing amongst each other in accordance with a complex relationship which depends on the operating treatment conditions. The alpha form which has a very low specific surface area is stable at higher temperature. The preference is to use aluminas which have a specific surface area of between 20 and 250 m/g and in particular gamma and/or delta alumina.

In order to enhance the thermal stability of the oxide or oxides in question, various compounds may be incorporated in the porous support, either directly in the form of pigments or in the form of precursor compounds of oxides. Rare earths, alkaline-earth metals and silica which are among the stabilizing agents which afford the highest levels of performance for alumina may advantageously be incorporated in the porous support.

In general those supports used in accordance with the present invention may advantageously have been treated, as is well known to the man skilled in the art, by porogenic agents such as those based on cellulose, naphthalene, natural gums or synthetic polymers, in such a way as to impart desired porosity properties to them.

The content of metal of the group formed by platinum and palladium in the catalyst according to the invention varies between 3 and 20 g per liter of catalyst and preferably between 5 and 15 g/l. If the content of precious metal is less than 3 g, the catalytic activity is not sufficiently high to satisfy the requirements of a combustion process. Conversely, when the content of precious metal exceeds 20 g, a further increase in the content of precious metal does not permit a significant increase in the level of catalytic activity. According to the invention palladium is preferred. However platinum may advantageously be used for a combustion stage operating at relatively low temperatures, for example at about 500° C., or in combination with palladium.

The presence of iron and cerium which are deposited simultaneously on the one or more refractory inorganic oxides makes it possible to enhance the activity and stability of the catalyst, in the course of time.

The content of iron in the catalysts according to the invention is between 0.01 and 3.5% by weight with respect to the support and more particularly between 0.1 and 2%. If the content of iron exceeds 3.5% the iron can then greatly accelerate the drop in specific surface area of the porous alumina-based support.

The content of cerium in the catalysts of the present invention is between 0.3 and 20% by weight with respect to the support and preferably between 2 and 15% by weight with respect to the porous support. If the content of cerium is lower than 0.3% this does not satisfactorily promote catalytic activity. Conversely when the cerium content exceeds 20% by weight with respect to the porous support a further increase in the cerium content does not permit a significant increase in catalytic activity.

Preparation of those catalysts which are deposited on a substrate consists of a coating step, in the course of which the substrate is immersed in a suspension containing the precursors of the components of the catalyst, and is then dried and roasted after evacuation of the excess of the suspension. A second step referred to as an impregnation step permits the active metals to be deposited. For that, the coated substrate is brought into contact with one or more solutions of the precursor or precursors of the active metals. After having been possibly drained the substrate which is thus coated and impregnated is dried and subjected to a heat treatment.

The deposit of iron and cerium on the catalyst support of the present invention can be produced using any of the procedures known to the man skilled in the art and may be effected at any moment in preparation of the catalyst. They may be introduced in the form of solid compounds (oxides, hydroxides, carbonates, hydroxycarbonates or insoluble salts) or soluble compounds (nitrates, sulphates, chlorides, alcoholates) into the coating suspension and/or pre-impregnated on to one of the constituents of the coating suspension and/or deposited on the porous support prior to impregnation of the metals and/or coimpregnated with the metals depending on the procedure envisaged. In the situation where the iron and cerium are deposited after shaping of the aluminas possibly containing other metals the methods used may be for example dry impregnation, impregnation by an excess of solution or ion exchange. When using a support which has already been shaped, a preferred method of introducing that additional element is impregnation in an aqueous medium, using an excess of solution. To remove the impregnation solvent' the impregnation operation is followed by a drying operation and a roasting step in air at a temperature of between 300 and 900° C.

In accordance with a particular mode of operation the support is successively impregnated with a solution containing compounds containing iron and cerium and then with a solution or solutions containing compounds of the precious metals which are to be introduced.

As compounds of iron and cerium which can be used, mention will be made in particular of the salts of iron and cerium and more particularly ferric nitrate, ammoniacal iron citrate, ferric chloride and cerous nitrate, cerous acetate, cerous chloride and ammoniacal ceric nitrate.

The precursors of the metals of the group formed by platinum and palladium are those which are conventionally used for the preparation of catalysts, in particular chlorides, chloro complexes, nitrates, amino complexes and acetylacetonates. By way of example mention may be made of chloroplatinic acid, palladium chloride, platinum tetrammine chloride, dinitrodiaminoplatinum and palladium nitrate.

The depth of impregnation may advantageously be regulated by the use of methods known to the man skilled in the art and in particular by the addition to the solution of precious metals of a certain amount of organic or inorganic acid. Nitric, hydrochloric and hydrofluoric acids or acetic, citric and oxalic acids are generally used.

The catalysts according to the invention provide improved levels of performance, especially in processes for the catalytic combustion of hydrocarbons such as methane, carbon monoxide, hydrogen or mixtures thereof. They can also be used however in any catalytic processes requiring elevated temperatures.

In addition the catalytic combustion reactors may comprise one or more catalytic stages, the formulations of which may be different. The catalysts of the present invention may be used in reactors having one stage or a plurality of catalytic stages. In the latter case they are preferably used in the catalytic stage or stages which operates or operate at temperatures below 1100° C.

The following Examples illustrate the invention without however limiting it:

The various precursors used are commercial products from PROLABO®. The elementary composition of the catalysts was determined by X-ray fluorescence (PHILIPS PW 1480®).

EXAMPLE 1

Preparation of a Catalyst C1

According to the Invention

Iron and cerium are deposited on gamma alumina by impregnation of 700 g of alumina with an aqueous solution of cerous nitrate and ferric nitrate. That solution contains the equivalent of 45 g of cerium oxide ($CeO_2$) and 15 g of iron oxide ($Fe_2O_3$).

The impregnated alumina is then dried at 150° C. and then roasted in air at 600° C. for a period of 3 hours.

A coating suspension is prepared from two liters of deionised water to which there are added the equivalent of 12 g of nitric acid, 600 g of alumina of gamma type which has been previously impregnated with iron and cerium, and 140 g of pseudo-boehnite with 72% of dry matter. That suspension is crushed in such a way that the size of the particles is less than 10 microns.

In a first step referred to as the coating step a ceramic monolith (cordierite) of 0.84 liter having 62 cells per cm (400 cells per square inch) is immersed in the suspension and then drained before the excess of suspension is removed by blowing. The support is then dried and then roasted in an oven in which the temperature is maintained at 600° C. for 2 hours. Those immersion, blowing and roasting steps are repeated a second time in order to deposit the equivalent of 120 g of porous support per liter of catalyst (substrate).

In a second step referred to as the impregnation step the coated monolith is immersed in a solution of palladium nitrate in such a way that the amount of palladium fixed after drying and roasting at 500° C. for a period of 2 hours is 3% by weight of palladium with respect to the porous support, that is to say, expressed with respect to the catalyst: 3.6 g of palladium per liter of catalyst.

This catalyst C1 prepared in that way contains by weight with respect to the porous support 4.13% of cerium, 1.31% of iron and 3% of palladium.

EXAMPLE 2 (COMPARATIVE)

Preparation of a Catalyst C2

To show the effect of the cerium on catalytic activity, a coating suspension is prepared from two liters of deionized water to which there are added the equivalent of 12 g of nitric acid, 600 g of alumina of gamma type which has been previously impregnated with iron and 140 g of pseudoboehmite with 72% of dry matter. That suspension is crushed in such a way that the size of the particles is less than 10 microns.

A ceramic monolith of 0.84 liter is coated by that alumina suspension using the process of Example 1 so as to deposit 120 g of porous support per liter of catalyst (substrate).

The monolith is then impregnated by a solution of palladium so as to deposit by weight 3% of palladium with respect to the coated porous support, that is to say expressed with respect to the catalyst: 3.6 g of palladium per liter of catalyst.

The catalyst C2 prepared in that way contains by weight with respect to the porous support 1.31% of iron and 3% of palladium.

EXAMPLE 3 (COMPARATIVE)

Preparation of a Catalyst C3

To show the effect of the iron on catalytic activity a coating suspension is prepared from two liters of deionized water to which there are added the equivalent of 12 g of nitric acid, 600 g of alumina of gamma type which has been previously impregnated solely with cerium and 140 g of pseudo-boehmite with 72% of dry matter. That suspension is crushed in such a way that the size of the particles is less than 10 microns.

A ceramic monolith of 0.84 liter is coated with that alumina suspension using the process of Example 1 so as to deposit 120 g of porous support per liter of catalyst (substrate).

The monolith is then impregnated with a solution of palladium so as to deposit by weight 3% of palladium with respect to the coated porous support, that is to say expressed with respect to the catalyst: 3.6 g of palladium per liter of catalyst.

The catalyst C3 prepared in that way contains by weight with respect to the porous support 4.15% of cerium and 3% of palladium.

EXAMPLE 4 (COMPARATIVE)

Preparation of a Catalyst C4

To show the effect of the iron and cerium on catalytic activity, a coating suspension is prepared from two liters of deionized water to which there are added the equivalent of 12 g of nitric acid, 600 g of alumina of gamma type without iron or cerium and 140 g of pseudoboehmite with 72% of dry matter. That suspension is crushed in such a way that the size of the particles is less than 10 microns. A ceramic monolith of 0.84 liter is coated with that alumina suspension using the process of Example 1 so as to deposit 120 g of alumina per liter of catalyst (substrate).

The monolith is then impregnated with a solution of palladium so as to deposit by weight 3% of palladium with respect to the coated porous support, that is to say expressed with respect to the catalyst: 3.6 g of palladium per liter of catalyst.

EXAMPLE 5

Preparation of a catalyst C5

According to the invention coating suspension is prepared from two liters of deionized water to which there are added the equivalent of 12 g of nitric acid, 600 g of alumina of gamma type previously impregnated with cerium and iron and 140 g of pseudo-boehmite with 72% of dry matter. That suspension is crushed in such a way that the size of the particles is less than 10 microns.

A ceramic monolith of 0.84 liter is coated with that alumina suspension using the process of Example 1 so as to deposit 120 g of porous support per liter of catalyst (substrate).

The monolith is then impregnated with a solution of palladium so as to deposit by weight 3% of palladium with respect to the coated porous support, that is to say expressed with respect to the catalyst: 3.6 g of palladium per liter of catalyst.

The catalyst C5 prepared in that way contains by weight with respect to the porous support 8.15% of cerium, 1.3% of iron and 3% of palladium.

EXAMPLE 6 (COMPARATIVE)

Preparation of a Catalyst C6

A coating suspension is prepared from two liters of deionized water to which there are added the equivalent of 12 g of nitric acid, 600 g of alumina of gamma type previously impregnated with cerium and 140 g of pseudo-boehmite with 72% of dry matter. That suspension is crushed in such a way that the size of the particles is less than 10 microns.

A ceramic monolith of 0.84 liter is coated with that alumina suspension using the process of Example 1 so as to deposit 120 g of porous support per liter of catalyst (substrate). The monolith is then impregnated with a solution of palladium so as to deposit by weight 3% of palladium with respect to the coated porous support, that is to say expressed with respect to the catalyst: 3.6 g of palladium per liter of catalyst.

The catalyst C6 prepared in that way contains by weight with respect to the porous support 40% of cerium and 3% of palladium.

EXAMPLE 7

Catalytic Activity of Catalysts C1 to C6.

The performances of the catalysts are compared in terms of the reaction for the combustion of methane, the main constituent of natural gas. Taking the prepared catalysts (references C1 to C6), cylinders measuring 1.5 cm in diameter and 5 cm in length are cut out, in the longitudinal direction of the passages.

The tests are conducted in a laboratory reactor comprising a tube into which the catalyst is introduced. The tube is disposed at the center of a cylindrical oven which can be raised to a temperature of 1500° C. An air-methane mixture with 3.5% by volume of methane is prepared by means of mass flow rate regulators and passed to the intake of the reactor. The hourly flow rate of the gases is 50,000 times greater than the volume of the substrate (VVH=50,000 h$^{-1}$). The concentration of methane at the intake and the discharge of the reactor is determined by means of a flame ionization detector (JUM engineering analyser model FID 3-300). Conversion of methane is the ratio in percentage between the difference in concentration of methane between the intake and the discharge and the concentration at the intake.

After a rise in temperature in the reaction mixture at 5° C./min from 250° C. to 530° C., the intake temperature of the reaction mixture is fixed at that temperature. Conversion of the methane is ascertained after 36 hours of operation under steady-state operating conditions. That period of time makes it possible significantly to discriminate the formulations involved, in dependence on their capacity for stabilizing the combustion of methane.

Table 1 sets out the elementary compositions of the catalysts C1 to C6 and the levels of conversion obtained after 36 hours of operation in a steady-state condition. Table 1 clearly shows the synergy effect as between the iron and the cerium, which results in better stability of catalytic activity for the catalysts which are prepared according to the invention.

EXAMPLE 9 (COMPARATIVE)

Preparation of a Catalyst C8 in Accordance with the Prior Art

A catalyst C8 based on iron, cerium and palladium is prepared using the operating procedure of Example 1 of U.S. Pat. No. 4,857,499 so as to deposit 120 g of porous support per liter of catalyst.

TABLE 1

Elementary composition of the catalysts C1 to C6 and conversions of those catalysts obtained after 36 hours of operation under steady-state conditions.

| Number of the Example | Reference of the catalyst | Content of Ce (in % by wt with respect to the support) | Content of Fe (in % by wt with respect to the support) | Content of Pd (in % by wt with respect to the support) | Content of Pd (in g/l of catalyst) | Conversion in % after 36 hours of operation |
|---|---|---|---|---|---|---|
| Example 1 according to the invention | C1 | 4.13 | 1.31 | 3 | 3.6 | 95 |
| Example 2 (comparative) | C2 | 0 | 1.31 | 3 | 3.6 | 45 |
| Example 3 (comparative) | C3 | 4.15 | 0 | 3 | 3.6 | 85 |
| Example 4 (comparative) | C4 | 0 | 0 | 3 | 3.6 | 45 |
| Example 5 according to the invention | C5 | 8.15 | 1.3 | 3 | 3.6 | >90 |
| Example 6 (comparative) | C6 | 40 | 0 | 3 | 3.6 | 45 |

EXAMPLE 8

Preparation of Catalyst C7 According to the Invention

A coating suspension is prepared from two liters of deionized water to which there are added the equivalent of 12 g of nitric acid, 600 g of alumina of gamma type previously impregnated with iron and cerium using the operating procedure described in Example 1 and 140 g of pseudo-boehmite with 72% of dry matter. That suspension is crushed in such a way that the size of the particles is less than 10 microns.

A ceramic monolith of 0.85 liter is coated with that suspension using the operating procedure of Example 1 so as to deposit 120 g of porous support per liter of catalyst (substrate).

The catalyst C7 prepared in that way contains by weight with respect to the porous support 4.13% of cerium, 1.31% of iron and 10% of palladium.

That catalyst C8 contains 4.13% of cerium and 1.31% of iron by weight with respect to the porous support and by weight with respect to the volume of catalyst: 12 g/l of palladium.

EXAMPLE 10

Catalytic Activity of Catalysts C7 and C8

Taking the prepared catalysts (references C8 and C7), cylinders measuring 1.5 cm in diameter and 5 cm in length are cut out in the longitudinal direction of the passages.

The evaluation procedure of Example 7 is adopted in order to compare catalysts C7 and C8.

Table 2 sets out the elementary compositions of catalysts C7 and C8 and the degrees of conversion obtained after 36 hours of operation in a steady-state condition.

TABLE 2

Elementary composition of catalysts C7 and C8 and conversions of such catalysts obtained after 36 hours of operation under steady-state conditions.

| Reference of the catalyst | Content of Ce (%) | Content of Fe (%) | Content of Pd (in % by wt with respect to the support) | Content of Pd (in g/l of catalyst) | Conversion in % after 36 hours of operation |
|---|---|---|---|---|---|
| C7 according to the invention | 4.13 | 1.31 | 10 | 12 | >95 |
| C8 comparative | 4.13 | 1.31 | 10 | 12 | 75 |

EXAMPLE 11

Preparation of Catalysts C9 and C10 According to the Invention

A new suspension is prepared from two liters of deionised water to which there are added the equivalent of 12 g of nitric acid, 600 g of alumina of gamma type and 140 g of pseudo-boehmite with 72% of dry matter.

Two monoliths of ceramic of 0.84 liter are coated with that suspension so as to deposit 120 g per liter of catalyst (substrate).

Each coated monolith is then impregnated with an aqueous solution of cerous nitrate and ferric nitrate. It is then dried at 120° C. and roasted at 500° C. for a period of 2 hours.

Each monolith is then impregnated separately by a solution of palladium so as respectively to deposit 10% and 5% by weight of palladium with respect to the impregnated coated layer, that is to say expressed with respect to the catalyst: 12 g and 6 g respectively of palladium per liter of catalyst.

The catalysts C9 and C10 prepared in that way contain by weight with respect to the impregnated coated layer 4.13% of cerium, 1.31% of iron and 10% of palladium for C9 and 5% of palladium for C10 respectively.

EXAMPLE 12 (COMPARATIVE)
Preparation of Catalysts C11 and C12 According to the Prior Art A monolith of 0.84 liter is coated by an alumina suspension using the mode of operation of Example 11 so as to deposit 120 g of alumina per liter.

That monolith is then impregnated with iron and cerium using the procedure described in Example 11.

The monolith is then impregnated with a palladium solution so as respectively to deposit 1% and 0.5% by weight of palladium with respect to the impregnated coated layer, that is to say expressed with respect to the catalyst: 1.2 g and 0.6 g of palladium per liter of catalyst respectively. The catalysts C11 and C12 prepared in that way contain by weight with respect to the impregnated coated layer 4.13% of cerium, 1.31% of iron and 1% of palladium for C11 and 0.5% of palladium for C12 respectively.

EXAMPLE 13
Catalytic Activity of Catalysts C9 to C12

Taking the prepared catalysts (references C9 to C12) cylinders measuring 1.5 cm in diameter and 5 cm in length are cut out in the longitudinal direction of the passages.

The evaluation procedure of Example 7 is adopted to compare catalysts C9 to C12 having different palladium contents.

Table 3 sets out the elementary compositions of the catalysts C9 to C12 and the degrees of conversion obtained after 36 hours of operation under steady-state conditions.

TABLE 3

Elementary composition of catalysts C9 to C12 and conversions of such catalysts obtained after 36 hours of steady-state conditions.

| Reference of the catalyst | Content of Ce (%) | Content of Fe (%) | Content of Pd (% with respect to the support) | Content of Pd (in g/l of catalyst) | Conversion in % after 36 hours of operation |
|---|---|---|---|---|---|
| C9 according to the invention | 4.13 | 1.31 | 10 | 12 | >95 |
| C10 according to the invention | 4.13 | 1.31 | 5 | 6 | >95 |
| C11 comparative | 4.13 | 1.31 | 1 | 1.2 | ≈85 |
| C12 comparative | 4.13 | 1.31 | 0.5 | 0.6 | 50 |

This Table clearly shows that a content of precious metal higher than those which are generally used in a post-combustion situation is necessary to satisfy the requirements of a catalytic combustion process. In contrast an excessively high content of precious metal does not significantly improve the levels of performance.

EXAMPLE 14 (COMPARATIVE)
Preparation of a Catalyst C13

In order to observe the effect of lanthanum, a good inhibitor for sintering of alumina, on the level of stability of catalytic activity, a coating suspension is prepared from two liters of deionized water to which there are added the equivalent of 12 g of nitric acid, 600 g of alumina of gamma type previously impregnated with lanthanum (21 g of $La_2O_3$) and 140 g of pseudo-boehmite with 72% of dry matter. That suspension is crushed in such a way that the size of the particles is less than 10 microns.

A ceramic monolith of 0.84 liter is coated with that suspension using the process of Example 1 so as to deposit 120 g of porous support per liter of catalyst (substrate).

The monolith is then impregnated with a solution of palladium so as to deposit by weight 3% of palladium with respect to the coated porous support, that is to say with respect to the catalyst: 3.6 g of palladium per liter of catalyst.

The catalyst C13 prepared in that way contains by weight with respect to the porous support 3% of $La_2O_3$ and 3% of palladium.

EXAMPLE 15 (COMPARATIVE)
Preparation of a Catalyst C14 According to the Prior Art In order to observe the effect of silica, which is a good inhibitor for sintering of alumina, on the level of stability of catalytic activity, a coating suspension is prepared from two liters of deionized water to which there are added the equivalent of 12 g of nitric acid, 600 g of alumina of gamma type previously impregnated with silicon and 140 g of pseudo-boehmite with 72% of dry matter. That suspension is crushed in such a way that the size of the particles is less than 10 microns. A ceramic monolith of 0.84 liter is coated with that suspension using the process of Example 1 so as to deposit 120 g of porous support per liter of catalyst (substrate).

The monolith is then impregnated with a solution of palladium so as to deposit by weight 3% of palladium with respect to the coated porous support, that is to say with respect to the catalyst: 3.6 g of palladium per liter of catalyst.

The catalyst C14 prepared in that way contains by weight with respect to the porous support 4% of $SiO_2$ and 3% of palladium.

EXAMPLE 16 (COMPARATIVE)
Preparation of a Catalyst C15

In order to observe the effect of barium, which is a good inhibitor of sintering of alumina, on the level of stability of catalytic activity, a coating suspension is prepared from two liters of deionized water to which there are added the equivalent of 12 g of nitric acid, 600 g of alumina of gamma type previously impregnated with barium and 140 g of pseudo-boehmite with 72% of dry matter. That suspension is crushed in such a way that the size of the particles is less than 10 microns.

A ceramic monolith of 0.84 liter is coated with that suspension using the process of Example 1 so as to deposit 120 g of porous support per liter of catalyst (substrate).

The monolith is then impregnated with a solution of palladium so as to deposit by weight 3% of palladium with respect to the coated porous support, that is to say with respect to the catalyst: 3.6 g of palladium per liter of catalyst.

The catalyst C15 prepared in that way contains by weight with respect to the porous support 3% of BaO and 3% of palladium.

EXAMPLE 17
Catalytic Activity of Catalysts C11 and C13 to C15

Taking the prepared catalysts (references C13 to C15) cylinders measuring 1.5 cm in diameter and 5 cm in length are cut out in the longitudinal direction of the passages. The evaluation procedure of Example 7 is adopted in order to compare catalysts C1 and C13 to C15 so as to evaluate the effect of the stabilizing agents for alumina on the level of stability of catalytic activity under steady-state conditions.

Table 4 sets out the elementary compositions of the catalysts C1 and C13 to C15 and the degrees of conversion obtained after 36 hours of operation under steady-state conditions.

Table 4 clearly shows that the promoters based on rare earth, alkaline earth metals or silica which are adapted to inhibit sintering of the alumina at high temperature do not make it possible effectively to limit the drop in catalytic activity observed in steady-state conditions (catalysts C13 to C15). On the other hand catalyst C1 according to the invention retains its activity.

12 g of nitric acid, 600 g of alumina of gamma type previously impregnated with iron and cerium using the operating procedure described in Example 1 and 140 g of pseudoboehmite with 72% of dry matter. That suspension is crushed in such a way that the size of the particles is less than 10 microns.

A ceramic monolith of 0.84 liter is coated with that suspension using the process of Example 1 so as to deposit 120 g of porous support per liter of catalyst (substrate).

The monolith is then impregnated with a solution of palladium so as to deposit by weight 5% of palladium with respect to the coated porous support, that is to say with respect to the catalyst: 6 g of palladium per liter of catalyst.

The catalyst C16 prepared in that way contains by weight with respect to the porous support 4.13% of cerium, 1.31% of iron and 5% of palladium.

EXAMPLE 19 (COMPARATIVE)
Preparation of a Catalyst C17

A ceramic monolith of 0.84 liter is coated with a suspension prepared as described in Example 14 using the process of Example 1 so as to deposit 120 g of porous support per liter of catalyst (substrate).

That monolith is then impregnated with a solution of palladium so as to deposit by weight 5% of palladium with respect to the coated porous support, that is to say with respect to the catalyst: 6 g of palladium per liter of catalyst.

The catalyst C17 prepared in that way contains by weight with respect to the porous support 3% of $La_2O_3$ and 5% of palladium.

EXAMPLE 20 (COMPARATIVE)
Preparation of a Catalyst C18

A ceramic monolith of 0.84 liter is coated with a suspension prepared as described in Example 18 using the process of Example 1 so as to deposit 120 g of porous support per liter of catalyst (substrate).

That monolith is then impregnated by a solution of palladium so as to deposit by weight 5% of support, which is equivalent to 6 g of palladium per liter of catalyst. In a second step that coated and impregnated monolith impregnated by a solution of 5% of manganese with respect to the coated porous support, that is to say 6 g of manganese per liter of catalyst.

TABLE 4

Composition of catalysts C1 and C13 to C15 and conversion of such catalysts obtained after 36 hours of operation under steady-state conditions.

| Reference of the Example | Reference of the catalyst | Content of Ce (%) | Content of Fe (%) | Content of Pd (in g/l of catalyst) | Content of stabilising oxide (%) | Conversion in % after 36 hours of operation |
|---|---|---|---|---|---|---|
| Example 1 according to the invention | C1 | 4.13 | 1.31 | 3.6 | 0 | >95 |
| Example 14 (comparative) | C13 | 0 | 0 | 3.6 | $La_2O_3$ (3%) | ≈46 |
| Example 15 (comparative) | C14 | 0 | 0 | 3.6 | $SiO_2$ (4%) | ≈69 |
| Example 16 (comparative) | C15 | 0 | 0 | 3.6 | BaO (3%) | ≈45 |

EXAMPLE 18
Preparation of a Catalyst C16 According to the Invention

A coating suspension is prepared from two liters of deionized water to which there are added the equivalent of The catalyst C18 prepared in that way contains by weight with respect to the porous support 3% of $La_2O_3$, 5% of palladium and 5% of manganese.

EXAMPLE 21 (COMPARATIVE)

Preparation of a Catalyst C19

A ceramic monolith of 0.84 liter is coated by a suspension prepared as described in Example 18 using the process of Example 1 so as to deposit 120 g of porous support per liter of catalyst (substrate).

That monolith is then impregnated by a solution of palladium so as to deposit by weight 5% of palladium with respect to the coated porous support, that is to say with respect to the catalyst: 6 g of palladium per liter of catalyst.

In a second step the coated and impregnated monolith is impregnated by a solution of zinc nitrate in such a way that the amount of zinc deposited is equal to 5% by weight with respect to the coated layer, that is to say with respect to the catalyst: 6 g of zinc per liter of catalyst.

The catalyst C19 prepared in respect to the porous support contains 3% of $La_2O_3$, 5% of palladium and 5% of zinc.

EXAMPLE 22

Catalytic Activity of the Catalysts C16 to C19

Taking the prepared catalysts (references C16 to C18) cylinders measuring 1.5 cm in diameter and 5 cm in length are cut out in the longitudinal direction of the passages.

The evaluation procedure of Example 7 is adopted in order to compare catalysts C16 to C18 in order to value the effect of the stabilizing agents for the metallic phase on the level of stability of catalytic activity.

Table 5 sets out the elementary compositions of the catalysts C16 to C18 and the degrees of conversion obtained after 36 hours of operation under steady-state conditions.

those three suspensions are respectively a solution of silicon, a solution of lanthanum and a solution of barium, in such a way that the (doping cation/$Al_{total}$) atomic ratio=0.01.

Three ceramic monoliths of 0.84 liter are coated with those suspensions using the process of Example 1 so as to deposit 250 g of porous support per liter of catalyst (substrate).

Those monoliths are then impregnated with a solution of iron and cerium using the procedure described in Example 11.

Finally each of those three monoliths is impregnated with a solution of palladium so as to deposit by weight 2.4% of palladium with respect to the coated porous support, that is to say with respect to the catalyst: 6 g of palladium per liter of catalyst.

The catalyst C20 prepared in that way contains by weight with respect to the porous support 4.13% of cerium, 1.31% of iron, 0.55% of Si and 5% of palladium, the catalyst C21 prepared in that way contains by weight with respect to the porous support 4.13% of cerium, 1.31% of iron, 2.7% of La and 5% of palladium, and the catalyst C22 prepared in that way contains by weight with respect to the porous support 4.13% of cerium, 1.31% of iron, 2.7% of Ba and 5% of palladium.

In addition catalysts C23, C24 and C25 containing a higher proportion of silicon, namely 1%, 2% and 3% respectively, are prepared in the same manner as catalyst C20.

EXAMPLE 24

Thermal Stability of Catalysts C20 to C25 According to the Invention

TABLE 5

Elementary composition of catalysts of C16 to C19 and conversions of those catalysts obtained after 36 hours of operation under steady-state conditions

| Reference of the Example | Reference of the catalyst | Content of Ce (%) | Content of Fe (%) | Content of $La_2O_3$ (%) | Content of Pd (g/l) | Content of stabilising agent (g/l) | Conversion in % after 36 hours of operation |
|---|---|---|---|---|---|---|---|
| Example 18 according to the invention | C16 | 4.18 | 1.31 | 0 | 6 | 0 | >95 |
| Example 19 (comparative) | C17 | 0 | 0 | 3 | 6 | 0 | 69 |
| Example 20 (comparative) | C18 | 0 | 0 | 3 | 6 | Mg (6g) | 60 |
| Example 21 (comparative) | C19 | 0 | 0 | 3 | 6 | Zn (6g) | 60 |

Table 5 clearly shows that the doping agents for stabilizing the metallic phase which are suitable for inhibiting sintering of the metallic phase at high temperature do not permit an effective limitation on the drop in catalytic activity observed in the steady-state condition (catalysts C17 to C19). In contrast catalyst C16 retains its activity.

EXAMPLE 23

Preparation of Catalysts C20 to C25 According to the Invention

In order to evaluate the impact of different doping agents for the alumina (Si, La, Ba) on the stability of the catalyst according to the invention, three identical suspensions of alumina with 30% of dry matter are prepared. Added to The hydrothermal ageing test is conducted in a laboratory reactor comprising a tube into which the catalyst is introduced. The tube is disposed within a cylindrical oven which can be raised to a temperature of 1200° C. An air/1% water vapor mixture is passed to the intake of the reactor. The flow rate is 11/h/gram of catalyst. The temperature is fixed at 900° C., measured by means of a thermocouple, and the duration of the treatment is 4 hours. Those operating conditions were chosen as they are representative of the conditions of operation of a combustion catalyst in a first stage of a catalytic combustion reactor. The surface area of the catalyst was measured after such a treatment in dependence on the nature of the doping agents. Table 6 sets out the elementary compositions involved and the measured surface area.

TABLE 6

Elementary composition of catalysts C16 and C20 to C25 and surface area after hydrothermal ageing at 900° C-4h-1% water.

| Reference of the catalyst | Content of CE (%) | Content of Fe (%) | Content of Pd (in g/l of catalyst) | Content of stabilising agent (% by wt) | Measured surface area after hydrothermal aging (m²/g) |
|---|---|---|---|---|---|
| C16 | 4.13 | 1.31 | 6 | 0 | 131 |
| C20 | 4.13 | 1.31 | 6 | Si (0.55%) | 154 |
| C21 | 4.13 | 1.31 | 6 | La (2.7%) | 139 |
| C22 | 4.13 | 1.31 | 6 | Ba (2.7%) | 131 |
| C23 | 4.13 | 1.31 | 6 | Si (1%) | 161 |
| C24 | 4.13 | 1.31 | 6 | Si (2%) | 165 |
| C25 | 4,13 | 1.31 | 6 | Si (3%) | 163 |

Table 6 shows that it may be particularly advantageous to add silicon in order to improve the resistance to sintering of the support. The preferred content of silicon is between 1 and 3%. In contrast lanthanum and barium which are rather attractive doping agents for inhibiting the transformation of alumina occurring at about 1 100° C.–1200° C.: theta alumina→alpha alumina (see the article by D L Trimm entitled: 'Thermal stability of catalysts supports' in the review Stud Surf Sci Catal Vol 68, 29–51 (1991) are found to be less effective than silicon.

EXAMPLE 25
Preparation of Catalysts C26, C27, C28, C29 and C30 According to the Invention In order to show the effect of the content of porous support on the stability of catalytic activity, a suspension is prepared as in Example 11. Five monoliths of ceramic, of 0.84 liter, are coated with that suspension using the process described in Example 1 so as to deposit respectively 200 g, 250 g, 300 g, 350 g and 400 g of porous support per liter of catalyst (substrate).

Those five monoliths when thus coated are impregnated with a solution of iron and cerium using the procedure described in Example 11.

Those five monoliths are then impregnated to an iso-content of palladium with respect to the substrate, that is to say 6 g of palladium per liter of catalyst, corresponding respectively to 3%, 2.4%, 2%, 1.71% and 1.5% by weight of palladium with respect to the porous support.

The catalysts prepared in that way are respectively numbered C26, C27, C28, C29 and C30.

EXAMPLE 26 (COMPARATIVE)
Preparation of a Catalyst C31

In order to evaluate the effect of the increase in the content of porous support to an iso-content of metal on the level of stability of catalytic activity of a formulation which is representative of the prior art, a ceramic monolith of 0.84 liter is coated by a suspension prepared as described in Example 14 so as to deposit 200 g of porous support per liter of catalyst (substrate).

The monolith when so coated is impregnated with a solution of iron and cerium using the procedure described in Example 11.

That monolith is then impregnated by a solution of palladium so as to deposit 6 g of palladium with respect to a liter of catalyst.

The catalyst C31 prepared in that way contains by weight with respect to the porous support 3% of $La_2O_3$ and 3% of palladium.

EXAMPLE 27 (COMPARATIVE)
Preparation of a Catalyst C32

A ceramic monolith of 0.84 liter is coated by a suspension containing iron, cerium and palladium, so as to deposit 200 g of porous support per liter of catalyst (substrate). The contents of iron and cerium are identical to those of catalysts C26 to C30.

The catalyst C32 prepared in that way contains by weight with respect to the porous support 4.13% of cerium, 1.31% of iron and 0.7% of palladium, that is to say 1.4 g of palladium per liter of catalyst.

EXAMPLE 28
Catalytic Activity of the Catalysts C10, C17 and C26 to 32

Taking the prepared catalysts (references C10, C17, C26, C27, C28, C29, C30, C31 and C32), cylinders measuring 1.5 cm in diameter and 5 cm in length are cut out in the longitudinal direction of the passages. The evaluation procedure of Example 7 is adopted to compare those catalysts in order to evaluate the effect of the content of porous support on the level of stability of catalytic activity.

Table 7 sets out the elementary compositions of catalysts C10, C17 and C26 to C32 and the degrees of conversion obtained after 36 hours of operation under steady-state conditions.

TABLE 7

Elementary composition of catalysts C10, C17 and C26 to C32 and conversions of the catalysts obtained after 36 hours of operation under steady-state conditions.

| Reference of the catalyst | Content of porous support g/l | Content of Ce (%) | Content of Fe (%) | Content of $La_2O_3$ (%) | Content of Pd (in g/l of catalyst) | % of conversion after 36 hours of operation |
|---|---|---|---|---|---|---|
| C10 according to the invention | 120 | 4.18 | 1.31 | 0 | 6 | >95 |
| C26 according to the invention | 200 | 4.18 | 1.31 | 0 | 6 | >98 |
| C27 according to the invention | 250 | 4.18 | 1.31 | 0 | 6 | >98 |
| C28 according to the invention | 300 | 4.18 | 1.31 | 0 | 6 | >98 |
| C29 according to the invention | 350 | 4.18 | 1.31 | 0 | 6 | >95 |
| C30 according to the invention | 400 | 4.18 | 1.31 | 0 | 6 | >90 |

TABLE 7-continued

Elementary composition of catalysts C10, C17 and C26 to C32 and conversions of the catalysts obtained after 36 hours of operation under steady-state conditions.

| Reference of the catalyst | Content of porous support g/l | Content of Ce (%) | Content of Fe (%) | Content of $La_2O_3$ (%) | Content of Pd (in g/l of catalyst) | % of conversion after 36 hours of operation |
|---|---|---|---|---|---|---|
| C17 comparative | 120 | 0 | 0 | 3 | 6 | ≈46 |
| C31 comparative | 200 | 0 | 0 | 3 | 6 | ≈46 |
| C32 comparative | 200 | 4.18 | 1.31 | 0 | 1.4 | ≈80 |

Table 7 clearly shows that the increase in the content of alumina to iso-content of palladium for the catalyst of the present invention increases the level of stability of catalytic activity of the catalyst. A content of higher than 200 g/l significantly improves that stability, but an excessively high content of porous support, that is to say higher than 400 g/l, is found to be harmful by virtue in particular of blockage of the passages in the monolith in the coating operation. On the other hand, for the catalyst C31 of the prior art, the increase in the content of porous support does not improve the stability of the catalyst in comparison with catalyst C17 of Example 19. FIG. 1 which shows the developments in the conversion of methane in dependence on time for the catalyst C26 according to the invention and the catalyst C31 of the prior art clearly shows that the catalytic activity of the catalyst C31 begins to oscillate after several hours of operation while the catalyst C26 retains a high level of activity (>98%) after 36 hours. As regards catalyst C32 whose contents of palladium and alumina are representative of automobile post-combustion catalysts, this does not retain sufficient stability in respect of catalytic combustion of methane, an application in which the operating conditions are greatly removed from the operating conditions of post-combustion.

EXAMPLE 29 (COMPARATIVE)
Catalytic Activity in Post-Combustion of the Catalyst C26 According to the Invention Taking the prepared catalyst C26 a cylinder measuring 30 mm in diameter and 76 mm in length is cut out in the longitudinal direction of the passages. That catalyst is tested on a laboratory assembly as described in Example 10 of patent application FR-A-90 15750 (corresponding to U.S. Pat. No. 5,413,984), lodged by the present inventors, in order to determine its behavior in relation to the oxidation of carbon monoxide, hydrocarbons and the reduction of nitrogen monoxide. The proportions of the mixture studied, which are characteristic of petrol vehicle exhaust gases, are as follows:

| | |
|---|---|
| CO: | 9000 ppm |
| NO: | 200 ppm |
| $CH_4$: | 97 ppm |
| $C_2H_2$: | 102 ppm (methane equivalent) |
| $C_2H_4$: | 581 ppm (methane equivalent) |
| $C_3H_3$: | 720 ppm (methane equivalent) |
| $CO_2$: | 10% $H_2O$: |
| | 7% |
| $O_2$: | 0.6% |
| $N_2$: | balance |

Figure 2:
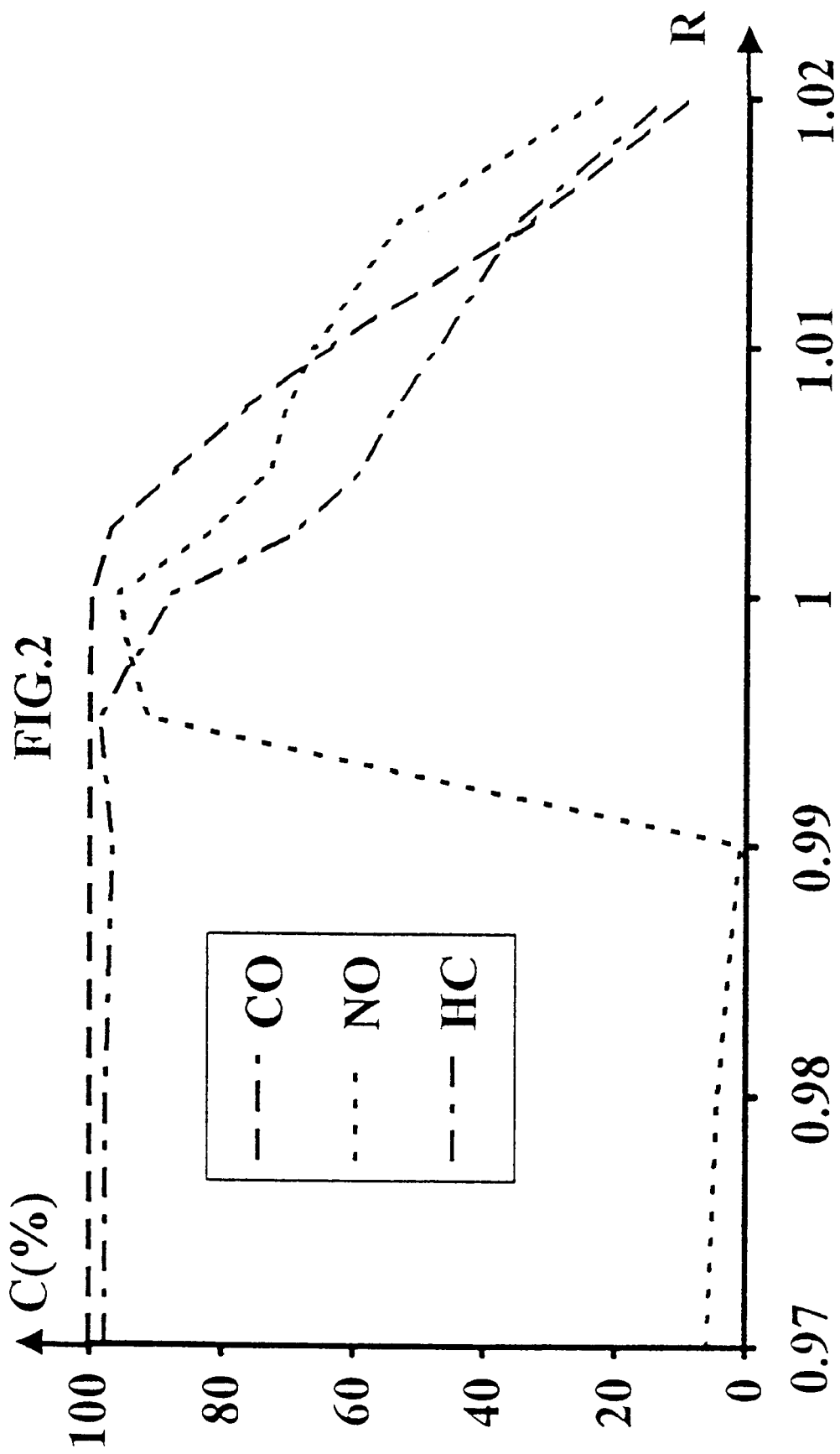
Figure 3:
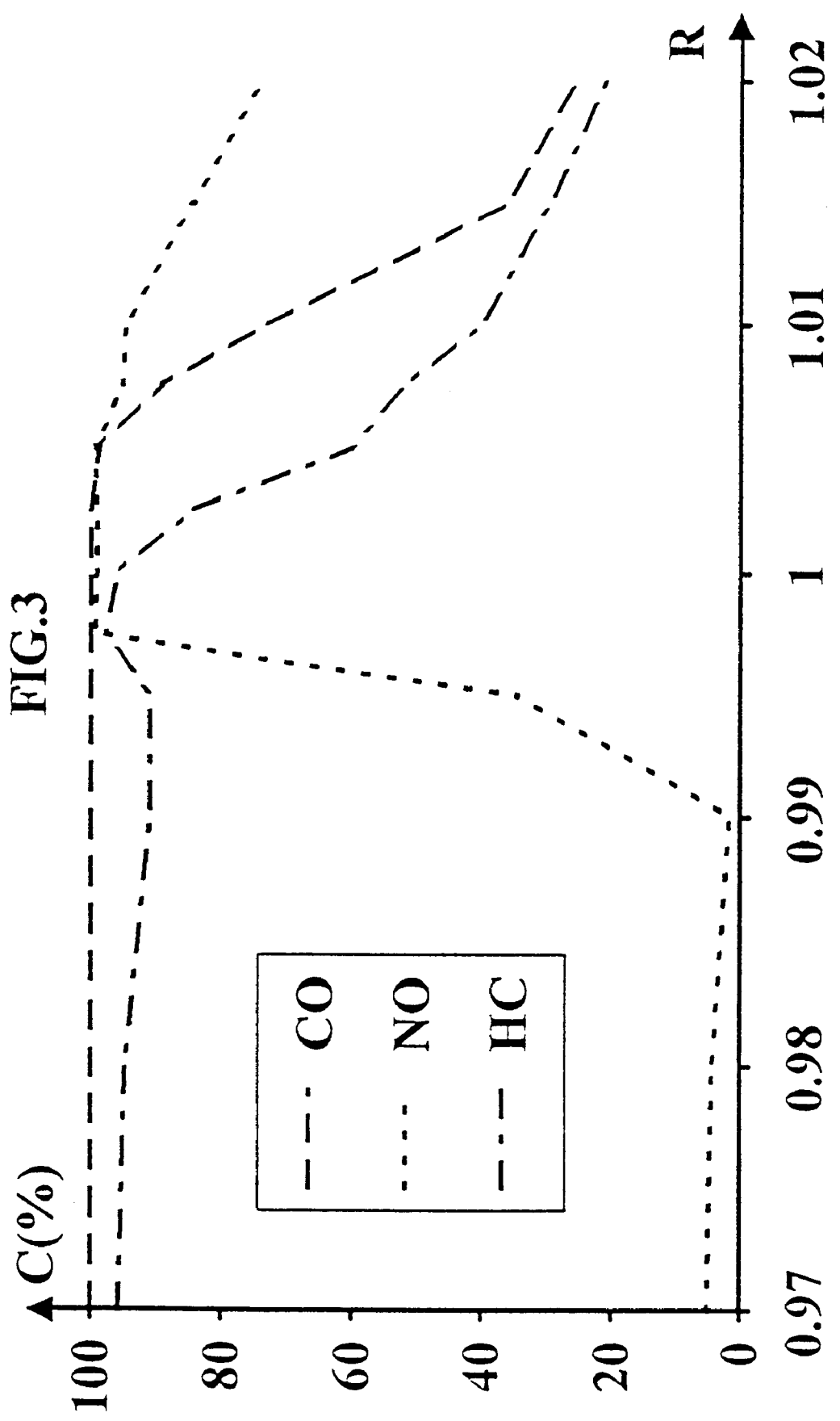

FIG. 2 shows the respective developments in the conversion of CO and hydrocarbons and the reduction of NO in dependence on the richness of the mixture. It is noted in particular that the reduction in NO is not total in contrast to a conventional post-combustion catalyst and that the NO reduction range is much narrower than for a conventional post-combustion catalyst (FIG. 3).

This Example 29 shows that a catalyst according to the invention is not suitable for treating the exhaust gases from a petrol vehicle operating at richness 1.

EXAMPLE 30
Preparation of a Catalyst C33 According to the Invention

To evaluate the effect of platinum on the combustion of methane a catalyst C33 is prepared in the same manner as catalyst C10 but with the palladium being replaced by platinum, to an iso-content of precious metal. The catalyst C33 contains 6 g of platinum per liter of catalyst.

The catalyst C33 prepared in that way contains by weight with respect to the porous support 4.13% of cerium, 1.31% of iron and 5% of platinum.

EXAMPLE 31
Catalytic Activity of Catalysts C10 and C33 According to the Invention Taking the prepared catalysts (references C10 and C33), cylinders measuring 1.5 cm in diameter and—5 cm in length are cut out in the longitudinal direction of the passages.

Figure 4:
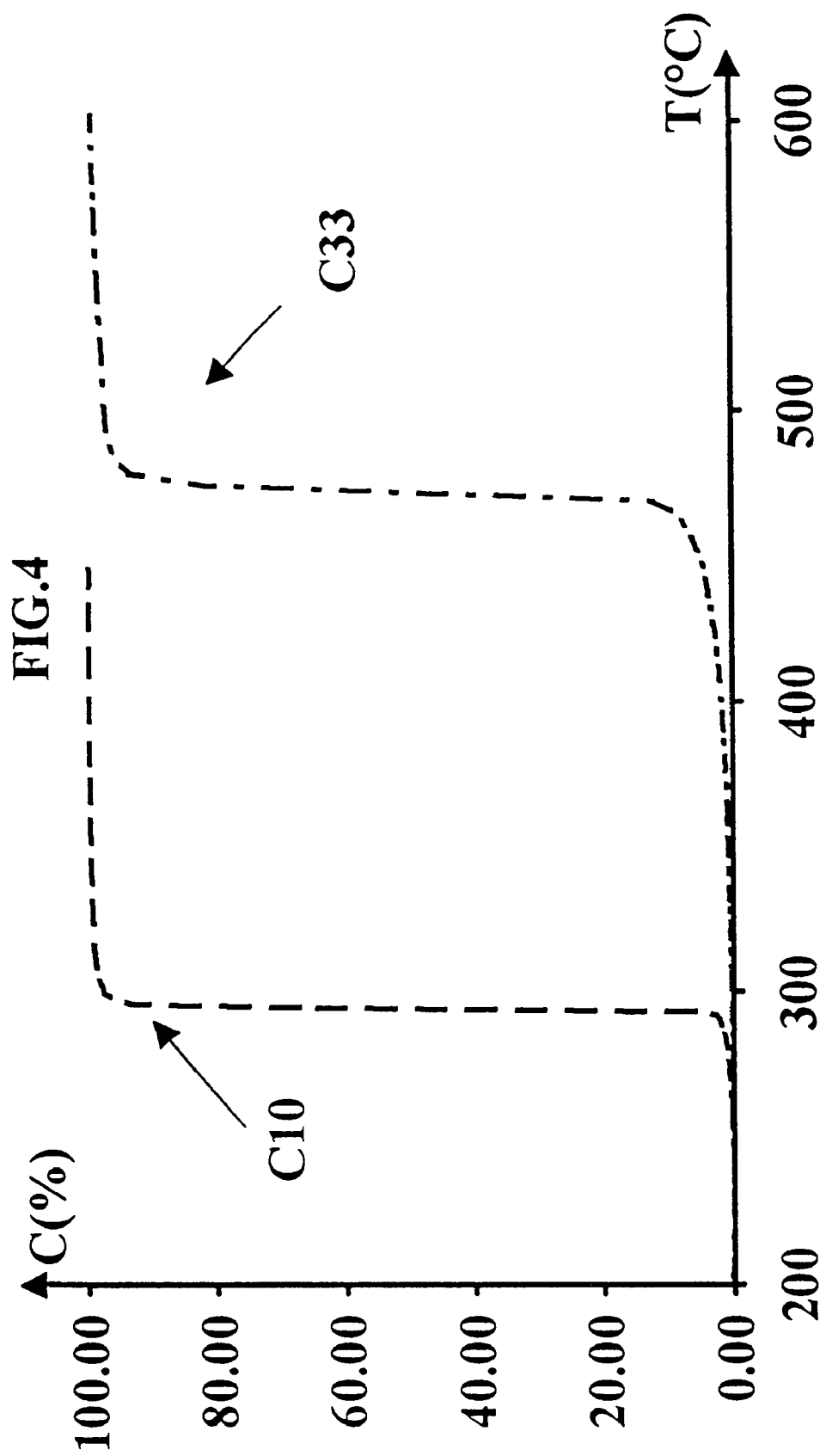

The tests are conducted in a laboratory assembly as described in Example 7. The reaction mixture is raised at a rate of 5° C./min from 250° C. to 875° C. The hourly flow rate of the gases is 50,000 times higher than the volume of the substrate (VVH=50,000 $h^{-1}$). The concentration of methane at the intake and at the discharge of the reactor is determined by means of a flame ionization detector. The methane conversion is the ratio in percentage between the difference in concentration of methane between the intake and the discharge of the reactor and the concentration at the intake. FIG. 4 shows the developments in the methane conversion in dependence on the intake temperature of the mixture in dependence either on catalyst C10 or catalyst C33.

Platinum is found to afford a lower level of performance than palladium for starting combustion of the methane: the half-conversion temperature is about 300° C. for catalyst C10 as against about 470° C. for catalyst 33.

EXAMPLE 32

Catalytic Activity of Catalysts C1, C5, C7, C9, C10 and C16 for Abating the Pollution Produced by the Exhaust Gases from Motor Vehicles that are Powered by Natural Gas In the prepared catalysts (references C5, C7, C9, C10 and C16), cylinders are cut that are 1.5 cm in diameter and 5 cm in length in the longitudinal direction of the channels.

The tests are carried out in a laboratory reactor that contains a pipe into which the catalyst is introduced. This pipe is placed in the center of a cylindrical furnace that can be brought to a temperature of 900° C. An oxygen-nitrogen-methane mixture at 0.15% in volume of methane, 0.30% oxygen, and 99.55% nitrogen is prepared with mass flow regulators and sent to the intake of the reactor. With this methane content being representative of the composition of the exhaust gases of motor vehicles that are powered by natural gas. The hourly flow rate of the gases is 50,000 times greater than the volume of the substrate (VVH=50,000 $h^{-1}$). The concentration of methane at the intake and at the outlet of the reactor is determined with a flame ionization detector (analyst JUM ENGINEERING model FID 3-300). The conversion of methane is the ratio in percent between the difference in methane concentration between the intake and the outlet and the intake concentration.

After a rise in temperature with a reaction mixture at 5° C./min from 250° C. to 530° C., the intake temperature of the reaction mixture is set at this temperature. The conversion of the methane after 50 hours of operation under stabilized conditions is determined. This length of time makes it possible to distinguish in a significant way the catalytic formulations from the standpoint of their stability to convert the methane into carbon dioxide and water.

The conversion of the methane obtained after 50 hours of operation under stabilized conditions is in each case higher than 95%.

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 94/13.739, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A process comprising combusting in the presence of a catalyst and in an oxidizing medium, at least one combustible substance containing methane and optionally other compounds selected from the group consisting of hydrocarbons, carbon monoxide, hydrogen and mixtures thereof, wherein the catalyst comprises a monolithic substrate, a porous support based on refractory inorganic oxide and an active phase formed by cerium, iron and at least one metal selected from the group consisting of palladium and platinum; the content of porous support being from 100 to 400 g per liter of catalyst; the content of cerium being between 0.3 and 20% by weight with respect to the porous support; the content of iron being between 0.01 and 3.5% of iron by weight with respect to the porous support; and the content of palladium and/or platinum being from 12 to 20 g per liter of catalyst; said catalyst having been produced by a process comprising introducing iron and cerium simultaneously into said refractory inorganic support before or after said support is coated on said monolithic substrate, and subjecting the resultant coated monolithic substrate to drying and calcining, said cerium and iron having been introduced into the refractory inorganic support prior to said drying and calcining of the coated monolithic substrate.

2. The process of claim 1, wherein in the catalyst the content of porous support is from 250 to 350 g per liter of catalyst; the content of cerium is between 2 and 15% by weight with respect to the porous support; the content of iron is between 0.1 and 2% of iron by weight with respect to the support; and the content of palladium and/or platinum is from 12 to 15 g per liter of catalyst.

3. The process of claim 1, wherein in the catalyst the porous support based on the refractory inorganic oxide is selected from the group consisting of alpha alumina, delta alumina, eta alumina, gamma alumina, kappa alumina, khi alumina, rho alumina, theta alumina, silica, silica-aluminas, titanium oxide, zirconia and mixtures thereof.

4. The process of claim 1, wherein in the catalyst said porous support has a specific surface area between 20 and 250 $m^2/g$.

5. The process of claim 1, wherein in the catalyst the porous support based on a refractory inorganic oxide is selected from the group consisting of alpha alumina, delta alumina, eta alumina, gamma alumina, kappa alumina, khi alumina, rho alumina and theta alumina.

6. The process of claim 1, wherein in the catalyst said support has been thermally stabilized by the introduction of at least one compound selected from the group consisting of oxides of trivalent rare earths, oxides of alkaline earth metals and silica.

7. The process of claim 1, wherein in the catalyst said support has been thermally stabilized by silica.

8. The process of claim 7, wherein the content of silica is from 1 to 5% by weight with respect to the porous support.

9. The process of claim 1, wherein in the catalyst said substrate is metallic or ceramic.

10. The process of claim 1, wherein the combusting is conducted in a plurality of catalytic stages of which at least one contains said catalyst and functions at temperatures of less than 1100° C.

11. The process of claim 1, wherein the combustible substance contains hydrocarbons and 95% or more of said hydrocarbons are methane.

12. A process for abating the pollution produced by exhaust gases of vehicles with controlled richness that run on natural gas which comprises combusting said exhaust gases in an oxidizing medium in the presence of a combustion catalyst comprising a monolithic substrate, a porous support based on refractory inorganic oxide and an active phase formed by cerium, iron and at least one metal selected from the group consisting of palladium and platinum; the content of porous support being from 100 to 400 g per liter of catalyst; the content of cerium being between 0.3 and 20% by weight with respect to the porous support; the content of iron being between 0.01 and 3.5% of iron by weight with respect to the porous support; and the content of palladium and/or platinum being from 12 to 20 g per liter of catalyst; said catalyst having been produced by a process comprising introducing iron and cerium simultaneously into said refractory inorganic support before or after said support is coated on said monolithic substrate, and subjecting the resultant coated monolithic substrate to drying and calcining, said cerium and iron having been introduced into the refractory inorganic support prior to said drying and calcining of the coated monolithic substrate.

13. The process of claim 12, wherein in the catalyst the content of porous support is from 250 to 350 g per liter of catalyst; the content of cerium is between 2 and 15% by weight with respect to the porous support; the content of iron is between 0.1 and 2% by weight with respect to the support; and the content of palladium and/or platinum is from 12 to 15 g per liter of catalyst.

14. The process of claim 12, wherein in the catalyst the porous support based on the refractory inorganic oxide is selected from the group consisting of alpha alumina, delta alumina, eta alumina, gamma alumina, kappa alumina, khi alumina, rho alumina, theta alumina, theta alumina, silica, silica-aluminas, titanium oxide, zirconia and mixtures thereof.

15. The process of claim 12, wherein in the catalyst said porous support has a specific surface area between 20 and 250 $m^2/g$.

16. The process of claim 12, wherein in the catalyst the porous support based on a refractory inorganic oxide is selected from the group consisting of alpha alumina, delta alumina, eta alumina, gamma alumina, kappa alumina, khi alumina, rho alumina and theta alumina.

17. The process of claim 12, wherein in the catalyst said support has been thermally stabilized by the introduction of at least one compound selected from the group consisting of oxides of trivalent rare earths, oxides of alkaline earth metals and silica.

18. The process of claim 12, wherein in the catalyst said support has been thermally stabilized by silica.

19. The process of claim 18, wherein the content of silica is from 1 to 5% by weight with respect to the porous support.

20. The process of claim 12, wherein in the catalyst said substrate is metallic or ceramic.

* * * * *